(12) United States Patent
Park

(10) Patent No.: US 10,585,497 B2
(45) Date of Patent: Mar. 10, 2020

(54) WEARABLE DEVICE

(71) Applicant: Jun Ho Park, Seoul (KR)

(72) Inventor: Jun Ho Park, Seoul (KR)

(73) Assignee: MotinVirtual, Inc., El Dorado Hills, CA (US)

( * ) Notice: Subject to any disclaimer, the term of this patent is extended or adjusted under 35 U.S.C. 154(b) by 0 days.

(21) Appl. No.: 15/504,644

(22) PCT Filed: Aug. 20, 2015

(86) PCT No.: PCT/KR2015/008686
§ 371 (c)(1),
(2) Date: Feb. 16, 2017

(87) PCT Pub. No.: WO2016/028097
PCT Pub. Date: Feb. 25, 2016

(65) Prior Publication Data
US 2017/0242496 A1     Aug. 24, 2017

(30) Foreign Application Priority Data
Aug. 20, 2014 (KR) .................. 10-2014-0108341

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/014* (2013.01); *G06F 3/016* (2013.01); *G06F 3/017* (2013.01);
(Continued)

(58) Field of Classification Search
CPC ...... G06F 3/017; G06F 3/0426; G06F 3/0304; G06F 3/011; G06F 3/04815; G06F 3/0425; G06F 3/014; G06F 3/0416; G06F 21/32; G06F 2203/0331; G06K 9/00; G06K 9/00006; G06K 9/00355; G06K 9/00013;
(Continued)

(56) References Cited

U.S. PATENT DOCUMENTS 6,861,945 B2 * 3/2005 Kim .................. G06F 3/014
340/407.1
8,570,273 B1 * 10/2013 Smith .................. G06F 3/0338
345/156
(Continued)

*Primary Examiner* — Dismery Mercedes
(74) *Attorney, Agent, or Firm* — Perkins Coie LLP

(57) ABSTRACT

Disclosed is a wearable device. The wearable device includes a depth sensor configured to 3-dimensionally sense a user's hand and to generate 3D scan information, a finger recognition unit configured to sense skin lines of user's fingers and to generate pattern information, an image processor configured to generate a 3D model of the user's hand based on the 3D scan information and to add a pattern representing the skin lines of the user's fingers to the 3D model based on the pattern information, and a key determination unit configured to, when the finger recognition unit senses a user's key input motion, generate an input value matching the key input motion, and the finger recognition unit senses the key input motion by comparing the sensed skin lines of the user's fingers with the pattern added to the 3D model.

10 Claims, 5 Drawing Sheets

(51) Int. Cl.
*G06K 9/00* (2006.01)
*G06F 3/042* (2006.01)
*G06F 3/03* (2006.01)

(52) U.S. Cl.
CPC .......... *G06F 3/0304* (2013.01); *G06F 3/0425* (2013.01); *G06F 3/0426* (2013.01); *G06K 9/001* (2013.01); *G06K 9/00087* (2013.01); *G06K 9/00355* (2013.01); *G06F 2203/0331* (2013.01)

(58) Field of Classification Search
CPC ........... G06K 9/00033; G06K 9/00087; G06K 9/00382; G06T 2207/30196; G06T 19/00; G06T 2207/30101
See application file for complete search history.

(56) References Cited

U.S. PATENT DOCUMENTS

| | | | |
|---|---|---|---|
| 8,773,512 B1* | 7/2014 | Rafii | G06F 3/017 348/47 |
| 8,965,069 B2* | 2/2015 | Inanc | G06K 9/036 382/125 |
| 9,076,027 B2* | 7/2015 | Miura | G06K 9/00087 |
| 9,367,651 B2* | 6/2016 | Algreatly | G06F 17/50 |
| 9,582,076 B2* | 2/2017 | Kienzle | G06F 3/014 |
| 9,760,214 B2* | 9/2017 | Li | G06F 3/0423 |
| 10,025,388 B2* | 7/2018 | Tang | G06K 9/00087 |
| 10,401,901 B2* | 9/2019 | Park | A61B 5/7475 |
| 2005/0148876 A1* | 7/2005 | Endoh | A61B 5/1171 600/454 |
| 2006/0274920 A1* | 12/2006 | Tochikubo | G06F 21/32 382/124 |
| 2011/0007035 A1* | 1/2011 | Shai | G06F 3/014 345/179 |
| 2012/0075173 A1* | 3/2012 | Ashbrook | G06F 3/014 345/156 |
| 2014/0098018 A1* | 4/2014 | Kim | G06F 3/014 345/156 |
| 2014/0204191 A1* | 7/2014 | Takai | G02B 27/017 348/77 |
| 2015/0084884 A1* | 3/2015 | Cherradi El Fadili | G06F 3/041 345/173 |
| 2015/0117708 A1* | 4/2015 | Guigues | G06T 7/0042 382/103 |
| 2015/0186708 A1* | 7/2015 | Katz | G06K 9/00087 382/115 |
| 2015/0338916 A1* | 11/2015 | Priyantha | G06F 3/017 345/173 |
| 2016/0124524 A1* | 5/2016 | Zhao | G06F 3/042 345/175 |
| 2017/0308117 A1* | 10/2017 | Park | G06K 9/00355 |

* cited by examiner

[Fig. 1]
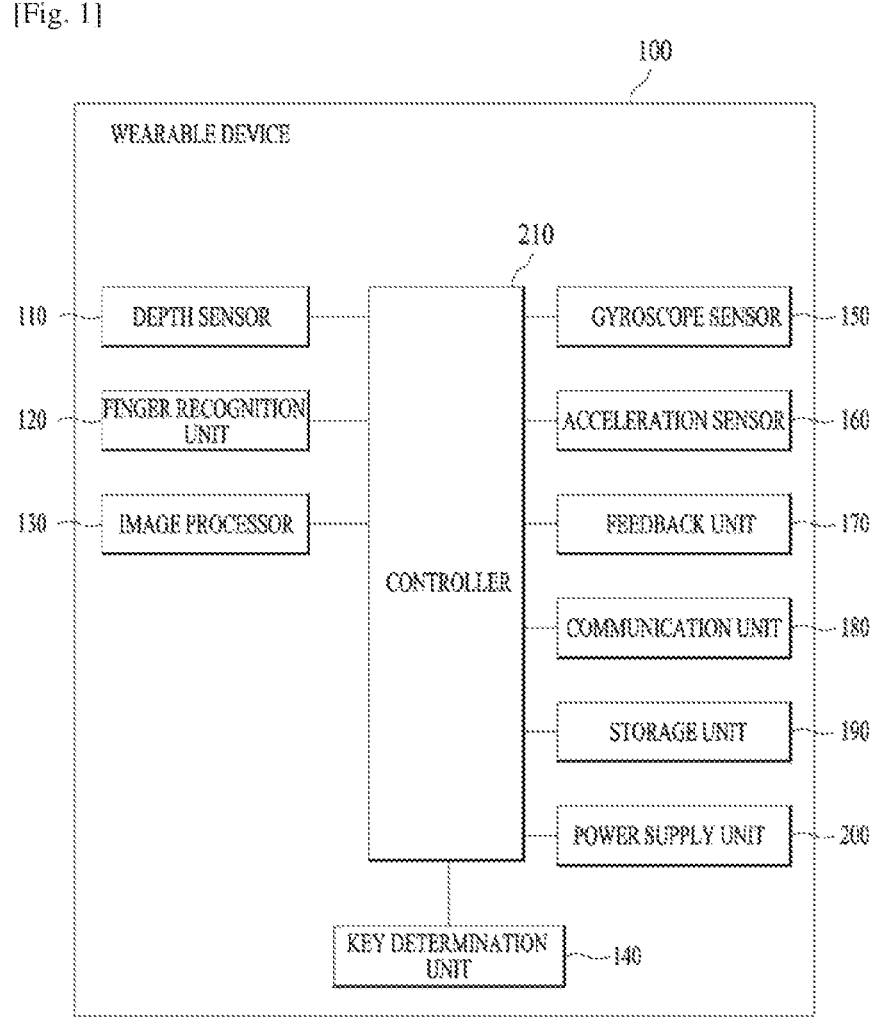

[Fig. 2]
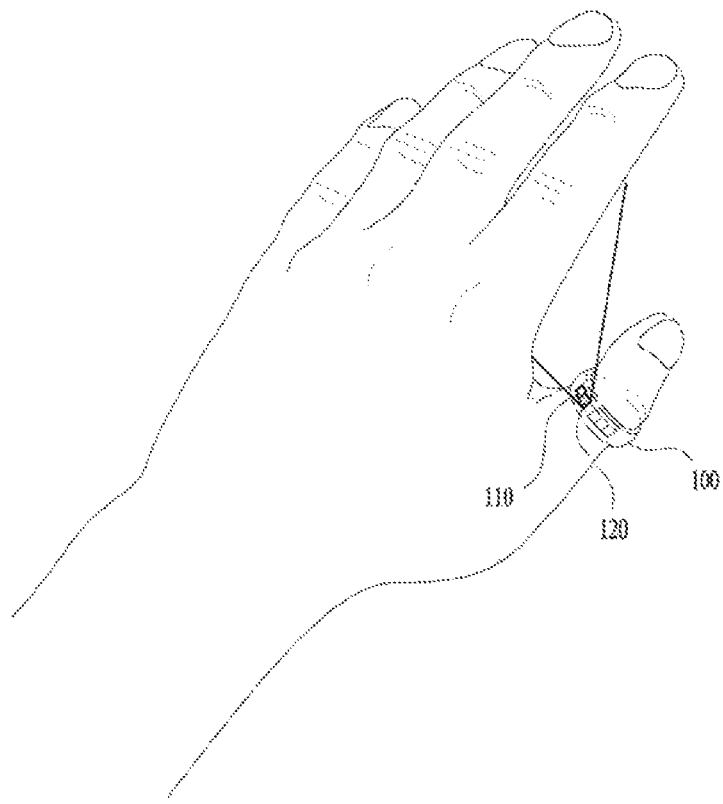
[Fig. 3]
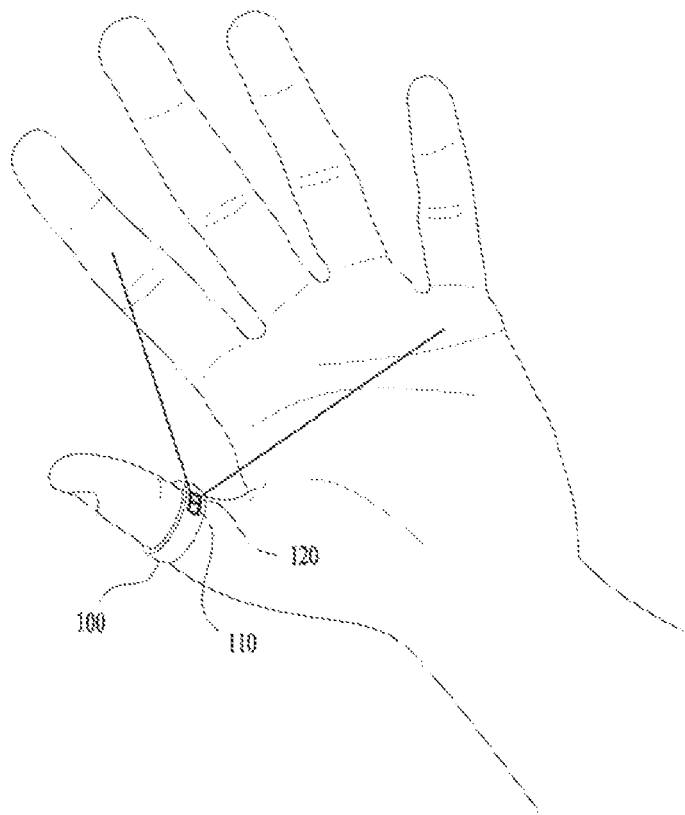

[Fig. 4]
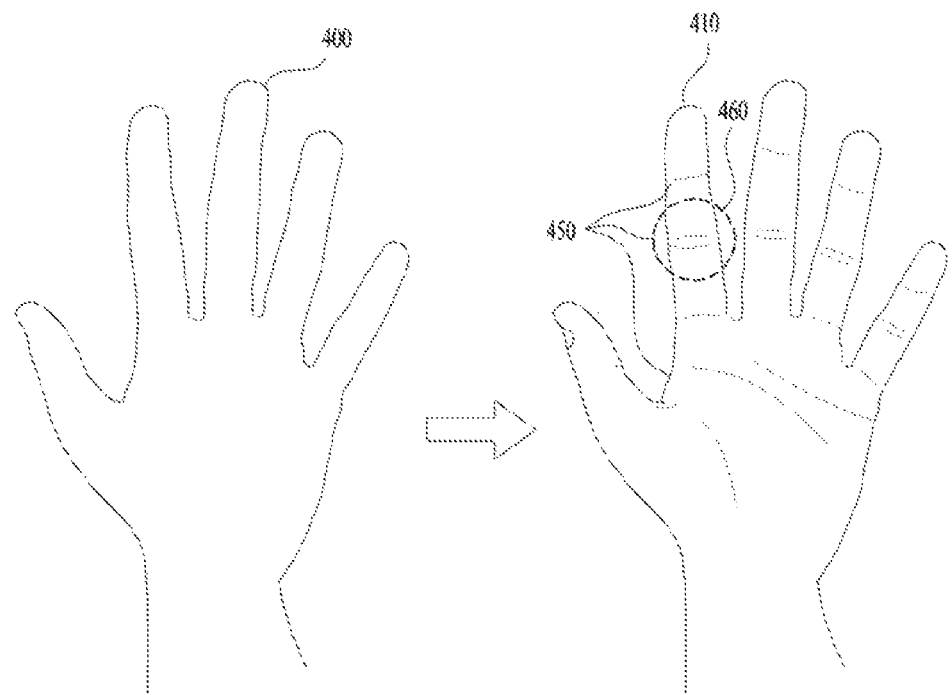
[Fig. 5]
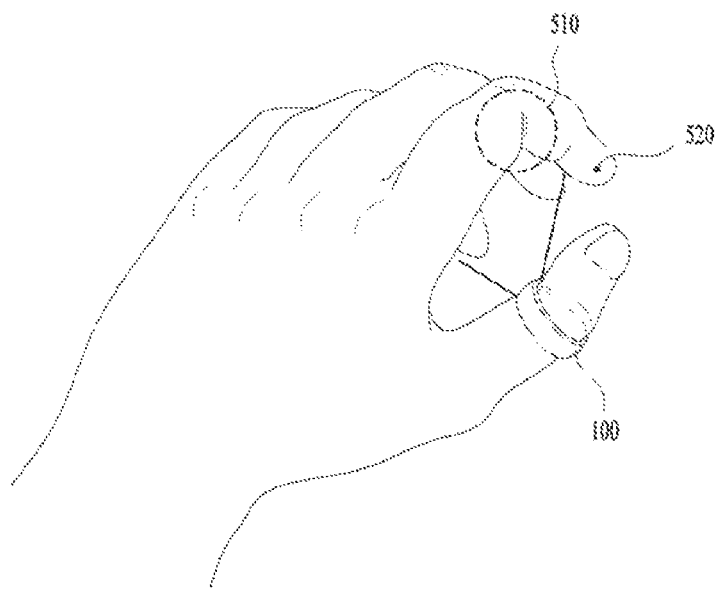

[Fig. 6]
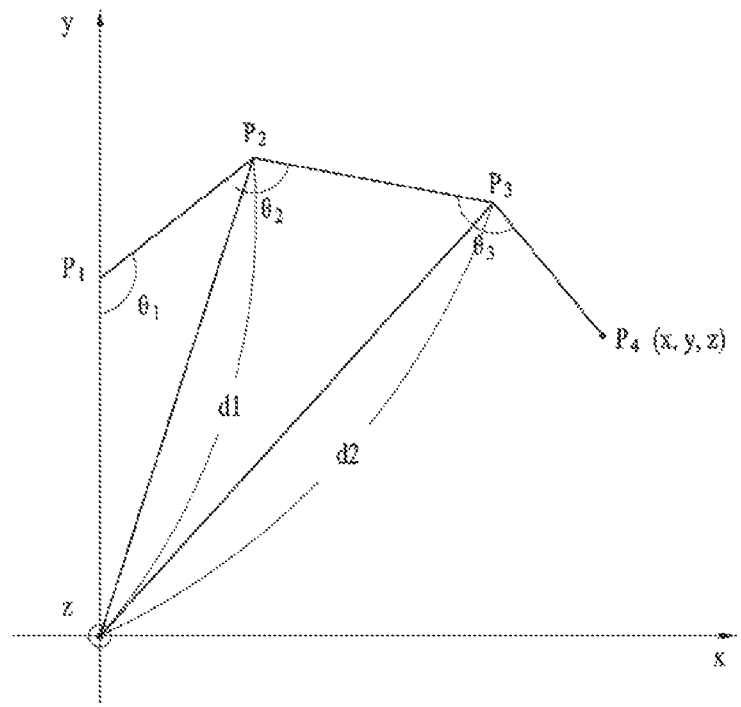
[Fig. 7]
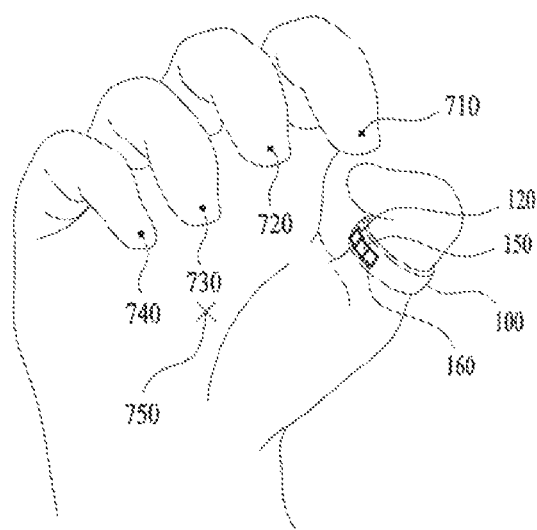

[Fig. 8]
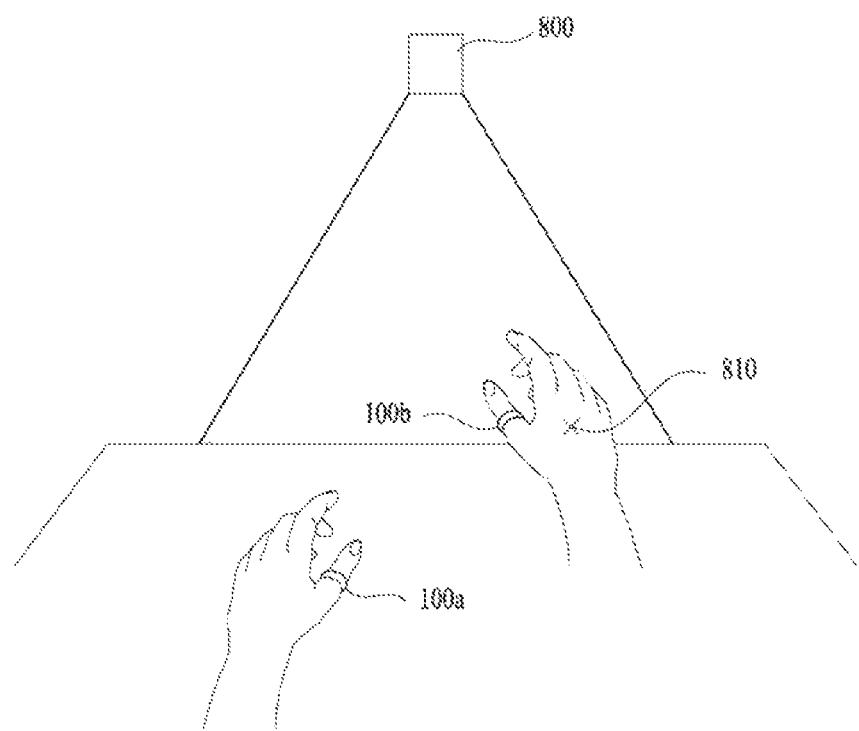
[Fig. 9]
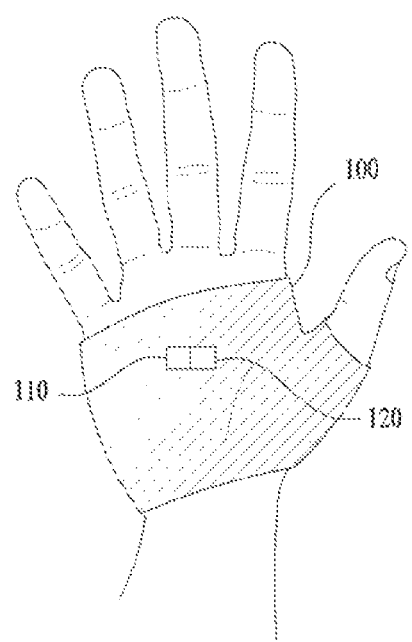

WEARABLE DEVICE

TECHNICAL FIELD

The present invention relates to a wearable device.

BACKGROUND ART

In a modern society in which use of electronic devices is essential to everyday life, electronic devices respectively include input units. However, among such general input units, 2D input units, such as a keyboard, a mouse and the like, are not greatly improved. Further, portability and convenience of the input units need to be improved.

Thereby, an input unit which may satisfy both portability and convenience is required. Particularly, in order to meet the miniaturization trend of electronic devices, a new input unit needs to process various input values so as to sufficiently use functions of electronic devices as well as to have portability and convenience.

DISCLOSURE OF INVENTION

Technical Problem

An object of the present invention is to provide a wearable device which allows a user to conveniently input data using a portable input unit.

Another object of the present invention is to provide a wearable device which allows a user to input various kinds of data so as to substitute for keyboard and mouse input units.

Yet another object of the present invention is to provide a wearable device which may maintain precision of input data as well as portability.

Technical objects to be accomplished by the present invention are not limited to the above objects, and other technical objects which are not stated will become apparent to those skilled in the art from the embodiments of the present invention given hereinbelow.

Solution to Problem

In one embodiment of the present invention, a wearable device includes a depth sensor configured to 3-dimensionally sense a user's hand and to generate 3D scan information, a finger recognition unit configured to sense skin lines of user's fingers and to generate pattern information, an image processor configured to generate a 3D model of the user's hand based on the 3D scan information and to add a pattern representing the skin lines of the user's fingers to the 3D model based on the pattern information, and a key determination unit configured to, when the finger recognition unit senses a user's key input motion, generate an input value matching the key input motion, wherein the finger recognition unit senses the key input motion by comparing the sensed skin lines of the user's fingers with the pattern added to the 3D model.

The key determination unit may determine the 3D positions of a first joint connecting the palm of the user's hand and a first phalange of a finger and a second joint connecting the first phalange and a second phalange of the finger and generate the input value based on the 3D positions of the first joint and the second joint.

The key determination unit may determine the 3D positions of the first joint and the second joint and the bending angles of the first joint and the second joint and calculate the position of the tip of the finger, the key input motion of which is sensed, according to the 3D positions and the angles of the two joints.

The depth sensor may include at least one of an infrared camera, a Time of Flight (ToF) camera, a laser transceiver and a stereo camera.

The finger recognition unit may include at least one of an RGB camera, an infrared camera and a Time of Flight (ToF) camera.

The wearable device may further include a gyroscope sensor and an acceleration sensor configured to measure movement and tilt of the wearable device in a 3D space.

When the gyroscope sensor and the acceleration sensor sense a user's mouse input motion, the key determination unit may generate a cursor value matching the mouse input motion and determine the position of the central part of the palm or back of the user's hand as the cursor value.

The finger recognition unit may sense a mouse click motion according to positions of the forefinger and the middle finger of the user's hand during sensing of the mouse input motion, and the key determination unit may generate a click value matching the mouse click motion.

The wearable device may further include a communication unit configured to receive 3D position information from an external device, and the key determination unit may sense a user's mouse input motion based on the 3D position information and generate a cursor value matching the mouse input motion.

The wearable device may be of a ring type surrounding a first phalange of the thumb of the user's hand or a glove type worn on the palm of the user's hand.

In another embodiment of the present invention, a wearable device includes a depth sensor configured to 3-dimensionally sense an object and to generate 3D scan information, a finger recognition unit configured to sense a pattern on the surface of the object and to generate pattern information, and an image processor configured to generate a 3D model of the object based on the 3D scan information and to add the pattern on the surface of the object to the 3D model based on the pattern information.

Advantageous Effects of Invention

Embodiments of the present invention may provide effects as below.

First, a user may execute improved data input through a wearable device which may provide both portability and convenience.

Second, the wearable device may replace a keyboard and a mouse and thus various data input may be executed using only the wearable device without any additional input unit.

Third, the wearable device may maintain precision of data input as well as portability and thus provide improved data input environment to a user.

Effects acquired by the embodiments of the present invention are not limited to the above-stated effects, and other effects which are not stated will be apparent to those skilled in the art from the embodiments of the present invention given hereinbelow. That is, effects which are not intended according to implementation of the present invention will be deduced from the embodiments of the present invention by those skilled in the art.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram illustrating configuration of a wearable device in accordance with one embodiment of the present invention;

FIG. 2 is a view illustrating an operating process of the wearable device in accordance with one embodiment of the present invention;

FIG. 3 is a view illustrating an operating process of the wearable device in accordance with one embodiment of the present invention;

FIG. 4 is a view illustrating an operating process of the wearable device in accordance with one embodiment of the present invention;

FIG. 5 is a view illustrating an operating process of the wearable device in accordance with one embodiment of the present invention;

FIG. 6 is a view illustrating an operating process of the wearable device in accordance with one embodiment of the present invention;

FIG. 7 is a view illustrating an operating process of the wearable device in accordance with one embodiment of the present invention;

FIG. 8 is a view illustrating an operating process of the wearable device in accordance with one embodiment of the present invention; and FIG. 9 is a view illustrating an implementation type of a wearable device in accordance with another embodiment of the present invention.

BEST MODE FOR CARRYING OUT THE INVENTION

The terms used in the following description are terms which are generally used at present taking into consideration the functions obtained in accordance with the present invention, and the definitions of these terms may be changed in accordance with the intention of an engineer in the art, a precedent, or advent of new technology. Further, there may be terms selected by the applicant and, in this case, these terms should be defined in the description of the present invention. Therefore, the terms used in the present invention should be defined based on the overall content of this specification.

In embodiments below, elements and features of the present invention are combined into a designated type. The respective elements or features may be selectively considered unless stated otherwise. The respective elements or features may not be combined with other elements or features. Further, some elements and/or features may be combined to produce embodiments of the present invention. A sequence of operations described in the embodiments of the present invention may be changed. Some elements or features in an embodiment may be included in any other embodiment or be replaced by corresponding elements or features of any other embodiment.

In a description of the drawings, procedures or operations which may obscure the spirit of the present invention are not described and procedures or operations which will be apparent to those skilled in the art are omitted.

In the following description of the present invention, it will be understood that the terms "comprising" and "including" do not exclude presence of one or more other elements but mean presence of the corresponding elements, unless stated otherwise. Further, the terms "part", "device" and "module" stated in the description mean a unit to process at least one function or operation and it may be implemented through combination of hardware, software, or hardware and software. Further, if it is stated in the description that an element is "connected to" another element, it may include not only physical connection but also electrical connection and further mean logical connection.

Further, "a" or "an", "one", "the" and their synonyms may indicate both singular and plural, unless stated otherwise in the description of the present invention (particularly, in the claims).

Further, a "user" in the specification may be a wearer or a user of a wearable device and include an engineer to repair the wearable device, but is not limited thereto.

Reference will now be made in detail to the preferred embodiments of the present invention, examples of which are illustrated in the accompanying drawings.

Further, Specific terms used in the embodiments of the present invention are provided only for a better understanding of the present invention and may be changed without departing from the scope and spirit of the invention as disclosed in the accompanying claims.

FIG. 1 is a block diagram illustrating configuration of a wearable device in accordance with one embodiment of the present invention. The wearable device 100 may further include other universal elements in addition to elements shown in FIG. 1, or include a smaller number of elements than the elements shown in FIG. 1. That is, the implementation type and scope of the wearable device 100 are not limited to those shown in FIG. 1.

The wearable device 100 is an input/output unit worn on a part of a user's body (for example, a hand). The wearable device 100 senses movement of the user's body using various sensors and generates data and signals according to a motion formed by the sensed movement. The wearable device 100 may transmit the generated data and signals to an external device or a device.

Hereinafter, various elements of the wearable device 100 will be respectively described. The wearable device 100 in accordance with this embodiment may include a depth sensor 110, a finger recognition unit 120, an image processor 130, a key determination unit 140, a gyroscope sensor 150, an acceleration sensor 160, a feedback unit 170, a communication unit 180, a storage unit 190, a power supply unit 200, and a controller 210. These elements may be connected to one another by wire or wirelessly and transmit/receive data and signals to/from one another. As described above, the elements shown in FIG. 1 are only exemplary so as to implement the wearable device. 100, and the wearable device 100 may include a greater or smaller number of elements than these elements.

The depth sensor 110 3-dimensionally scans an object and generates 3D scan information. That is, the depth sensor 110 transmits various kinds of signals to the object and senses change of the signals transmitted from the surface of the object or senses signals reflected by the object. The depth sensor 110 may analyze the sensed signals and generate 3D scan information of the object. For example, the depth sensor 110 may 3-dimensionally sense a user's hand and generate 3D scan information of the external appearance of the user's hand.

The depth sensor 110 serving to 3-dimensionally scan an object may include various kinds of sensors or devices. For example, the depth sensor 110 may include an infrared camera which transmits an infrared signal to an object and senses change of the signal on the surface of the object, a Time of Flight (ToF) camera which transmits an ultrasonic signal or an optical signal to an object and measures a time difference with a signal reflected by the object, a laser transceiver which transmits a laser signal to the object and senses a signal reflected by the object, and a stereo camera which analyzes a difference between values acquired by photographing an object from two positions. Further, a Light Detection And Ranging (LIDAR) method in which pulse laser light is radiated into the atmosphere and then a reflective body or a scattering body thereof is used, a speckle interferometry method in which change of a pattern of coherent light reflected by the surface of an object is used, an Infrared Proximity Array (IPA) sensing method using two LEDs, and an RGB camera may be employed to implement the depth sensor 110.

The depth sensor 110 to 3-dimensionally scan an object is not limited to the embodiment having the above-described elements but may include various other elements. Further, the depth sensor 110 may include a combination of two or more of the above-described elements.

Further, after the depth sensor 110 performs the process of 3-dimensionally scanning the object, the depth sensor 110 may improve precision of 3D scan information using computer vision technique. The computer vision technique is used to improve precision of depth information during a process of interpreting a 2D image and includes a depth-from-focus method, a depth-from-stereo method, a depth-from-shape method, a depth-from-motion method and the like. The depth sensor 110 may precisely generate 3D scan information of the object using the above-described various methods.

Although the above description exemplarily states the case that the object is a part of a user's body, such as a hand, the disclosure is not limited thereto. That is, the object may mean not only a part of a human body but also an article, a space or a structure. For example, if the object is an article, such as a portable terminal, a notebook, or a desk, the depth sensor 110 may 3-dimensionally scan the portable terminal, the notebook, or the desk and generate 3D scan information. Further, if the wearable device 100 is located within a room, the depth sensor 110 may scan a space and walls within the room as the object. Thereby, the depth sensor 110 may recognize a 3D space by the walls of the room and generate 3D scan information of the walls. In this case, the depth sensor 110 may detect the position of the wearable device 100 within the room, i.e., the absolute coordinates of the wearable device 100 within a designated space. Hereinafter, the case that the object is a part of a user's body, particularly, a hand, will be exemplarily described. A case that the object is an article, a space or a structure will be described in detail later with reference to FIG. 9.

The finger recognition unit 120 senses finger skin lines by scanning the palm of the user's hand. Various types of palm lines and fingerprints are present on the palm and various kinds and types of skin lines are present on finger joints. Such physical features are expressed as chroma, brightness and color differing from other parts on the palm skin. That is, skin lines and palm lines are characterized in that they are darker than other parts on the palm skin. The finger recognition unit 120 senses user's physical features, i.e., palm lines, fingerprints and skin lines, and generates pattern information using a sensed result. Further, the finger recognition unit 120 may sense distribution of these physical features. That is, distribution of skin lines, palm lines and fingerprints may become an object of a pattern sensed by the finger recognition unit 120 and thus be used as pattern information. In addition, the finger recognition unit 120 may sense distribution of skin colors and be used as pattern information. That is, considering that the skin does not have the same color and brightness throughout the palm of the hand, the finger recognition unit 120 may measure and sense distribution of skin colors. That is, the finger recognition unit 120 may sense distribution of skin colors, i.e., dark or bright parts, red or white parts, and blue parts, through which blood vessels are visible, on the palm of the hand.

The finger recognition part 120 may use an RGB camera, an infrared camera, or a TOF camera so as to sense features of a user's body. In addition, the finger recognition part 120 may be implemented so as to include and use various kinds of sensors applied to the depth sensor 110. The finger recognition part 120 photographs or sense the palm of the user's hand using the above-described various kinds of cameras, sensors and modules and recognizes parts having brightness, color and chroma differing other parts of the palm of the user's hand. Pattern information is generated using such a result of recognition. In the same manner as the depth sensor 110, the finger recognition unit 120 may include a combination of two or more of the above-described elements.

The finger recognition unit 120 senses user's key input motion, mouse input motion, and mouse click motion according to scanning of user's physical features. Although this will be described in detail, the finger recognition unit 120 may sense the key input motion in which a user inputs a specific key or a combination of keys, the mouse input motion in which the user moves a cursor of a mouse, and the mouse click motion in which the user clicks a button of the mouse by photographing and analyzing movement of user's physical features.

Although, as exemplarily shown in FIG. 1, the depth sensor 110 and the finger recognition unit 120 may be separately provided, they may be implemented as one unit. That is, if the depth sensor 110 and the finger recognition unit 120 are implemented as an infrared camera or an RGB camera, the two elements are not separately provided and may be integrated into one unit. That is, the infrared camera or the RGB camera may perform the functions of both the depth sensor 110 and the finger recognition unit 120.

The image processor 130 is connected to the depth sensor 110 and the finger recognition unit 120 and receives and processes 3D scan information and pattern information from the depth sensor 110 and the linger recognition unit 120. In more detail, the image processor 130 may generate a 3D image using the 3D scan information received from the depth sensor 110 and generate a 3D model of the object through a 3D rendering process. As one example, if the object is a user's hand, when the depth sensor 110 senses the user's hand, the image processor 130 may generate a 3D model of the hand. As another example, if the object is an article, such as a portable phone, the image processor 130 may generate a 3D model of the portable phone. The 3D model may be expressed in black/white or color.

Further, the image processor 130 may add a pattern or a design to the generated 3D model using the pattern information received from the finger recognition unit 120. As described above, for example, in skin lines, palm lines and fingerprints of the hand, the finger recognition unit 120 may sense skin lines, palm lines and fingerprints of the user's hand and transmit pattern information to the image processor 130. Thereby, the image processor 130 may analyze the received pattern information and add an analyzed pattern to the 3D model of the user's hand. That is, the image processor 130 may generate a 3D model in which the pattern of skin lines, palm lines and fingerprints of the user's hand is mapped onto a 3D model representing only the external appearance of the user's hand.

When the image processor 130 generates the 3D model with the pattern mapped thereunto, the finger recognition unit 120 may analyze the sensed features of the user's body and the pattern of the 3D model and thus sense the above-described key input motion, mouse input motion and mouse click motion. That is, the finger recognition unit 120 senses the above-described various user's motions by comparing the pattern information, generated by the features of the user's body, with the pattern of the 3D model, and a detailed description thereof will be given with reference to FIGS. 4 to 7.

The key determination unit 140, as the user's key input motion is sensed, generates an input value matching the corresponding key input motion. That is, when the finger recognition unit 120 transmits the fact that the finger recognition unit 120 senses the key input motion from a result of analysis of movement of the user's body features to the key determination unit 140, the key determination unit 140 determines a key or a combination of keys corresponding to the key input motion. An input value may be generated as a result of determination and transmitted to other devices or the server through the communication unit 180.

The key determination unit 140 may generate a resultant value according to the mouse input motion and the mouse click motion. That is, when the gyroscope sensor 150 and the acceleration sensor 160, which will be described later, sense the user's mouse input motion, the key determination unit 140 generates a cursor value matching the sensed mouse input motion. Differently, if the communication unit 180, which will be described later, receives 3D position information from the outside, the key determination unit 140 may generate a cursor value according to the received 3D position information. Similarly to the key input value, the cursor value may be transmitted to other devices or the server through the communication unit 180.

The mouse click motion may be sensed by the above-described finger recognition unit 120. While the gyroscope sensor 150 and the acceleration sensor 160 sense the mouse input motion, the finger recognition unit 120 may sense the mouse click motion based on the positions of user's index and middle fingers. The key determination unit 140 may generate a click value according to the sensed mouse click motion and transmit the generated click value to other devices or the server through the communication unit 180. The above-described mouse input motion and mouse click motion will be described in more detail with reference to FIG. 7.

The gyroscope sensor 150 measures an angular velocity and thus senses the tilt of the wearable device 100. Kinds and functions of gyroscope sensors will be apparent to those skilled in the art and a detailed description thereof will thus be omitted. The acceleration sensor 160 may measure change of a velocity and thus sense the acceleration and tilt of the wearable device 100. Also, kinds and functions of gyroscope sensors will be apparent to those skilled in the art and a detailed description thereof will thus be omitted.

The gyroscope sensor 150 and the acceleration sensor 160 measure the movement and tilt of the wearable device 100 in a 3D space. That is, the gyroscope sensor 150 and the acceleration sensor 160 sense the above-described mouse input motion by measuring the moving direction, velocity and tilt of the wearable device 100 in the 3D space. The mouse input motion may be analyzed by the key determination unit 140 and converted into a cursor value.

The feedback unit 170 transmits tactile feedback to a user using various units. In various cases, the tactile feedback may be generated and transmitted to the user. For example, if the wearable device 100 is located at specific coordinates in the space or passes through the corresponding coordinates, and if a signal indicating transmission of the tactile feedback to the user is received from content reproduced in an external device connected to the wearable device 100, the tactile feedback may be provided to the user.

The feedback unit 170 may transmit the tactile feedback to the user through various units. For example, the feedback unit 170 may include a vibration module to transmit a vibration signal to a user or include a pressure module so that a user wearing the wearable device 100 may feel pressure. Further, the feedback unit 170 may provide tactile feedback to the user through a shear stress module or transmit microcurrent, which does not influence a user's body, to the user through a current module.

The communication unit 180 executes data communication and executes transmission and reception of signals with the outside. For example, the communication unit 180 may be connected to an external network wirelessly, communicate with an external device or the server, and include one or more communication modules for communication.

The communication unit 180 may include modules to execute a communication function, such as wireless LAN, Wi-Fi, Bluetooth, ZigBee, Wi-Fi Direct (WED), Ultra Wide-Band (UWB), Infrared Data Association (IrDA), Bluetooth Low Energy, and Near Field Communication (NEC) modules, as modules for short range communication.

The communication unit 180 may transmit the input value, the cursor value, the click value and the like generated by the key determination unit 140 to the outside using the above-described communication modules. Further, the communication unit 180 may receive 3D position information from au external device using the above-described communication modules.

The storage unit 190 may store data and information input to and output from the wearable device 100. For example, the storage unit 190 may store the input value, the cursor value and the click value generated by the key determination unit 140. Further, the storage unit 190 may store various kinds of program data or algorithm data executable by the wearable device 100.

The storage unit 190 may include at least one storage medium of a flash memory type, a multimedia card micro type, a card type memory (for example, an SD or XD memory), a Random Access Memory (RAM), a Static Random Access Memory (SRAM), a Read-Only Memory (ROM), an Electrically Erasable Programmable Read-Only Memory (EEPROM) and a Programmable Read-Only Memory (PROM). Further, the wearable device 100 may use web storage or a cloud server which performs the storage function of the storage unit 190 over the Internet.

The power supply unit 200 supplies power to drive the wearable device 100. The power supply unit 200 may include various kinds of power supply units, such as a Liion battery, a Li-polymer battery and the like, and the wearable device 100 may include a plurality of power supply units 200. The power supply unit 200 may be connected to other elements of the wearable device 100 by wire so as to supply power to the wearable device 100 and be charged by external power received wirelessly through wireless power transmission. Further, the power supply unit 170 may include a flexible battery which may be bent or spread to a designated degree or more.

The controller 210 is connected to the above-described elements and controls the overall operation of the wearable device 100. For example, the controller 210 may transmit the 3D scan information generated by the depth sensor 110 to the image processor 130 or transmit the pattern information generated by the finger recognition unit 120 to the image processor 130. Further, the controller 210 may compare the 3D model generated by the image processor 130 with the pattern information sensed by the finger recognition unit 120 and control the key determination unit 140 to generate an input value. That is, the controller 210 may control various functions allowing the wearable device 100 to function as an input unit or an output unit according to user's motions.

Hereinafter, an embodiment in which the wearable device 100 is operated according to movement of a user's body will be described. Hereinafter, a wearable device which is worn on a user's thumb into a ring type will be described unless there is a specific statement. The wearable device 100 may be worn on a user's left or right hand or user's both hands, and this may be implemented through simple change of design and structure.

Further, the wearable device 100 may be implemented as a separated type into two or more pieces. That is, the elements shown in FIG. 1 may be included in any one piece or two or more pieces of the wearable device 100 and the two or more pieces of the wearable device 100 may transmit and receive data by interworking with each other. That is, the wearable device 100 may include some or all of the elements shown in FIG. 1 and, if the wearable device 100 includes some of the elements, the wearable device 100 may be operated in cooperation with another wearable device 100 including other elements.

FIGS. 2 and 3 are views illustrating operating processes of the wearable device in accordance with embodiments of the present invention. FIG. 2 illustrates an embodiment in which the wearable device 100 is worn on a first phalange of a thumb of a user's left hand.

As described above, the wearable device 100 includes the depth sensor 110 and the finger recognition unit 120. FIG. 2 illustrates a type of the wearable device 100 in which the depth sensor 110 and the finger recognition unit 120 are disposed adjacent to each other and other functional modules which are not represented by reference numerals are arranged in a line. Such an arrangement type is only an exemplary implementation for convenience of description and the elements included in the wearable device 100 are not limited to the arrangement type.

That is, the wearable device 100 may include one ore more depth sensors 110 and one or more finger recognition units 120 and they may be separated from each other by a designated distance or more. Further, if two wearable devices 100 separated from each other are provided, each of the two wearable devices 100 may include one depth sensor 110 and one finger recognition unit 120. In this case, one ring-type wearable device 100 may surround a first phalange of the thumb of a user's hand, as exemplarily shown in this figure, and another ring-type wearable device 100 may surround a first phalange of the ring finger of the user's hand. Mounting of the wearable device 100 on fingers is not limited to such a position and the wearable device 100 may be worn on any phalange of any finger.

As described above, the depth sensor 110 3-dimensionally senses a user's hand and generates 3D scan information and the finger recognition unit 120 senses physical features on the palm of the user's hand, such as skin lines of the finger, palm lines, fingerprints and the like, and generates pattern information. That is, the depth sensor 110 and the finger recognition unit 120 may sense the key input motion, mouse input motion or mouse click motion of a user wearing the wearable device 100 and the wearable device 100 may generate an input value, a cursor value and a click value corresponding to the respective motions.

FIG. 3 is a view illustrating an operating process of the wearable device in accordance with one embodiment of the present invention. The embodiment of FIG. 3 is similar to the embodiment of FIG. 2 but differs from the embodiment of FIG. 2 in that the wearable device 100 faces the palm of a user's hand.

The finger recognition unit 120 of the wearable device 100 may be disposed at a position with an angle and a direction to easily detect movement of user's fingers. That is, the finger recognition unit 120 needs to sense the key input motion, the mouse input motion and the mouse cursor motion by scanning movement of phalanges and joints of user's fingers, thus being disposed at a position to continuously observe the fingers. Particularly, the finger recognition unit 120 may be disposed as a type which may recognize the position and angle of a joint connecting the first phalange and the second phalange of a user's finger and the position and angle of a joint connecting the second phalange and the third phalange of the user's finger with high precision.

Further, considering that the wearable device 100 does not receive or sense biological signals of a user, the wearable device 100 is not always worn on a user's finger or hand. That is, a user may perform a key input motion, a mouse input motion and the like under the condition that the wearable device 100 is placed on a desk at a position which may effectively sense movement of fingers.

FIG. 4 is a view illustrating an operating process of the wearable device in accordance with one embodiment of the present invention. FIG. 4 illustrates a process of generating a 3D model of a user's hand through the wearable device.

First, the left portion of FIG. 4 will be described. The depth sensor of the wearable device 3-dimensionally senses a user's hand and generates 3D scan information. As shown in this figure, in order to scan the entirety of a user's left hand, the wearable device may be worn on other body parts (for example, the thumb of the right hand) instead of the thumb of the left hand. The user may move his/her right hand on which the wearable device is worn around his/her left hand so that the depth sensor may 3-dimensionally scan the left hand.

In the wearable device, information regarding the palm of a user's hand is more important than information regarding the back of the user's hand. Therefore, the user may move the wearable device such that the depth sensor executes scanning at a low speed when the depth sensor faces the palm of the left hand and execute scanning at a higher speed when the depth sensor faces the back of the left hand so as to allow the wearable device to precisely acquire 3D scan information of the palm of the user's hand. Otherwise, if it is not necessary to precisely acquire 3D information of the back of the hand, the user may omit the 3D scanning process of the back of the hand.

The depth sensor generates 3D scan information of the user's hand and transmits the corresponding information to the image processor. The image processor generates a 3D model 400 of the user's left hand by analyzing and processing the 3D scan information. The 3D model 400 may be a 3D image and be generated through a 3D rendering process.

The 3D model 400 generated using a result of scanning by the depth sensor, i.e., the 3D scan information, may not represent user's physical features (for example, skin lines, palm lines, fingerprints and the like) in detail. That is, the depth sensor may precisely measure the external appearance of the user's hand but may not sense detailed features represented on the palm of the finger.

Thus, a process of adding a pattern to the 3D model 400 is performed, as shown in the right portion of FIG. 4. The finger recognition unit of the wearable device may sense skin lines on the palm of the user's hand and the like and generates pattern information using the sensed result. Particularly, skin lines of a joint 460 connecting the first phalange and the second phalange of a user's finger plays an important role in sensing various motions of the user, as will be described later, and thus needs to be sensed with high brightness and clear color.

A series of processes of sensing user's physical features and generating pattern information through the finger recognition unit may be carried out simultaneously with or separately from the process of generating 3D scan information through the depth sensor. That is, while the depth sensor 3-dimensionally recognizes a user's hand and generates 3D scan information, the finger recognition unit may generate pattern information, such as skin lines, palm lines and the like. In this case, both the 3D scan information and the pattern information are transmitted to the image processor and the image processor sequentially processes the two pieces of information and generates a 3D model. In such an embodiment, a pattern-added 3D model 410 may be generated through one scan process differently from the above description.

Differently, when the depth sensor scans a hand of an object and generates 3D scan information and the image processor generates a 3D model using the 3D scan information, a process of generating pattern information through the finger recognition unit may be additionally performed. In this case, the process of scanning the object, i.e., a hand, through the wearable device needs to be carried out twice. That is, in the former case, both 3D scan information and pattern information are generated by one scan process but, in the latter case, 3D scan information may be generated through the first scanning process and pattern information may be generated through the second scanning process. In the latter case, the image processor generates a 3D model in advance and then processes received pattern information.

The pattern information generated by the finger recognition unit is transmitted to the image processor and a process of mapping the pattern 450 onto the 3D model 400 is performed. That is, the image processor may generate the pattern-added 3D model 410 by executing the process of mapping the pattern 450 onto the 3D model 400 generated by the 3D scan information.

FIGS. 5 and 6 illustrate a process of analyzing a user's key input motion using the 3D model described with reference to FIG. 4 and user's skin lines. First, FIG. 5 is a view illustrating an operating process of the wearable device in accordance with one embodiment of the present invention.

As exemplarily described with reference to FIG. 4, the image processor generates a 3D model of an object (for example, a user's left hand) using 3D scan information and pattern information. After such an initial process of generating the 3D model has been performed, the wearable device 100 continuously senses skin lines, fingerprints and palm lines of the hand. That is, the finger recognition unit senses the positions and movement of physical features (skin lines, fingerprints, palm lines and the like) by continuously scanning movement of a finger of the hand on which the wearable device 100 is worn. For example, the finger recognition unit of the wearable device 100 may scan skin lines represented on a joint 510 connecting the first and second phalanges of the user's hand.

When a user performs a key input motion (i.e., typing), physical features of the palm of the user's hand, such as skin lines, palm lines and the like, are changed according to movement of fingers. For example, as a finger is bent, an interval between skin lines located at a joint between finger phalanges becomes narrow, brightness of the skin lines becomes dark and boundaries of the skin lines become clear. Thereby, the finger recognition unit senses physical features changed according to movement of fingers.

The wearable device 100 may compare the sensed physical features with the generated pattern of the 3D model. That is, the wearable device 100 generates the 3D model in advance using pattern information regarding the user's hand, skin lines, palm lines and the like. Therefore, when skin lines are changed due to a user's typing motion, sensed change of the skin lines may be compared with the skin line pattern of the generated 3D model.

For example, as exemplarily shown in FIG. 4, the wearable device 100 generates the 3D model 410 including the pattern of the joint 460 of the forefinger of a user's left hand in advance and then senses a user's typing motion. When the user desires to press a specific key using the forefinger of the left hand, the wearable device 100 senses change of skin lines 510 of the joint 460 of FIG. 4. The finger recognition unit of the wearable device 100 may recognize change of brightness, change of color, change of thickness, and change of visibility of the skin lines and compare these changes with the pre-stored pattern of the 3D model 410.

The wearable device may detect the 3D position of the joint 460 according to changes of the skin lines and calculates change of an angle formed by the first phalange and the second phalange according to bending of the finger. Such a calculation process may be performed through comparison between changes of the skin lines and the pre-stored pattern of the 3D model 410.

When the 3D position of the joint 460 and the bending angle of the joint 460 are measured, the wearable device 100 calculates the position 520 of the tip of the corresponding finger. The position 520 of the tip of the corresponding finger may be a 3D position and the 3D position matches a specific input value according to a user's key input motion.

In summary, the wearable device 100 continuously senses user's skin lines, palm lines, fingerprints and the like and compares sensed changes of physical features with the pre-stored 3D model. From such a result of comparison, the wearable device 100 may calculate a designated input value matching a key input motion. A detailed process of calculating the position 520 of the tip of the finger will be described with reference to FIG. 6.

FIG. 6 is a view illustrating an operating process of the wearable device in accordance with one embodiment of the present invention. In FIG. 6, x/y/z axes represent a 3D space and lines connecting the origin and points P1, P2, P3 and P4 represent a frame from a user's wrist to a finger if an object is a user's hand. That is, the origin represents the center of the wrist, the point P1 represents a joint connecting the palm to the first phalange of the finger, the point P2 represents a joint connecting the first phalange to the second phalange of the finger, the point P3 represents a joint connecting the second phalange to the third phalange of the finger, and point P4 represents the tip of the finger.

In accordance with the embodiment shown in FIGS. 4 and 5, the wearable device may calculate the 3D position and bending angle of a joint connecting the first phalange to the second phalange of a user's finger. That is, the wearable device may, calculate a 3D position and an angle θ2 of the point P2 in FIG. 6. Since the wearable device generates and stores a 3D model of a user's hand, calculation of the 3D position of the point P2 means calculation of a distance d1 from the center of the wrist to the point P2.

Similarly to the point P2, the wearable device may calculate a 3D position and an angle θ1 of the point P1. Otherwise, during the process of generating the 3D mode, the wearable device may calculate a distance from the center of the wrist to a joint between the palm and the first phalange, i.e., the position of the point P1, in advance. In this case, the wearable device may calculate the angle θ1 through comparison with the pattern in a similar manner as the angle θ2. In another method, the wearable device may detect the position of the point P1 by sensing the palm or palm lines. That is, the wearable device may scan the palm lines in the same manner as the skin lines of fingers and sense change of the palm lines according to movement of the fingers. Subsequently, the wearable device may recognize change of the palm lines by comparing the sensed palm line pattern with palm line pattern information of the 3D model 410 shown in FIG. 4. In this case, the wearable device may detect the position of the point P1 indirectly from change of the palm lines. Through any of the above-described three methods, the wearable device may calculate all of the positions of the points P1 and P2 and the angles θ1 and θ2.

On the assumption that a user's finger is bent according to a natural motion, if the coordinates of the point P1, the coordinates of the point P2, and the angles θ1 and θ2 are given, all of the coordinates of the point P3, the angle θ3 and the coordinates of the point P4 may be calculated. Such a process may be carried out by an experimental method, i.e., estimation by experience. However, unless the user consciously bends finger joints by abnormal angles, the coordinates of the point P3 and the angle θ3 may be calculated with high precision from relations among the coordinates of the point P the coordinates of the point P2, and the angles θ1 and θ2. Further, similarly, the position information of the point P4 may be precisely calculated from relations among the coordinates of the point P1, the coordinates of the point P2, the coordinates of the point P3, and the angles θ1, θ2 and θ3.

In the above-described process, the ranges of the angles θ1, θ2 and θ3 may become an issue. That is, the angles θ1, θ2 and θ3 need to be within 180 degrees. If a user raises a finger highly, a joint connecting the user's palm and the first phalange of the finger may be 180 degrees or more. However, such an angle is far from a normal key input motion. Therefore, during a process of measuring the angles θ1, θ2 and θ3 of the joints, the wearable device may acquire only values of angles which are within 180 degrees as significant values. The wearable device may be implemented so as to ignore values of the angles θ1, θ2 and θ3 which are greater than 180 degrees, or to map the angles θ1, θ2 and θ3 which are greater than 180 degrees to a specific motion.

There are various methods to improve precision in such an estimation process. For example, after generation of the 3D model of a hand is initially carried out, the wearable device may instruct a user to perform a motion to input a specific key. When the user makes a natural motion to input the corresponding key, the wearable device may sense such a motion and foreknow which value needs to be compensated for during the estimation process of the point P3, the point P4 and the angle θ3. That is, software compensation may be carried out during a process of calculating an input value according to a user's key input motion.

In another method, the wearable device may directly measure the 3D position of the point P3 and the angle θ3. That is, the finger recognition unit may compare skin lines of the joint connecting the second phalange to the third phalange of a finger with the pattern of the 3D model and thus measure the 3D position and bending angle of the corresponding joint. In this case, since the wearable device directly measures the points P1, P2 and P3, the angles θ1, θ2 and θ3 and a distance d2, precision in estimation of the point P4 is greatly raised. Otherwise, the above-described software compensation method is carried out together with the method of directly measuring the point P3 and the angle θ3.

Consequently, as a user performs typing, the wearable device senses a key input motion, judges a key to which such a key input motion corresponds, and generates an input value. Such an input value may be transmitted to an external device or a server connected to the wearable device and the wearable device is operated as an input unit.

The embodiment in which the wearable device senses key input motions of the forefinger, the middle finger, the ring finger and the little ringer of a user's hand has been described above. Further, the wearable device needs to sense a key input motion of the thumb. First, a case that the wearable device is worn on the thumb will be described. The wearable device may directly measure or indirectly estimate the position of the thumb on which the wearable device is worn.

If the wearable device is worn on a user's thumb and directly measures a key input motion of the thumb, the depth sensor and the finger recognition unit sense an angle sufficient to recognize the position of the tip of the thumb. Thereby, the wearable device may calculate 3D position information of the thumb on which the wearable device is worn. Further, the wearable device may also calculate by what distance the wearable device is separated from the position of the tip of the thumb.

Differently, if the wearable device indirectly measures the key input motion of the thumb, the wearable device may estimate the position of the thumb from the positions of joints of other four fingers. That is, the wearable device may estimate its own 3D position from the positions of the points P1 and P2 of the other tour fingers. If the wearable device estimates its own position using the points P1 or P2, the points P1 or P2 of the four fingers, i.e., information of four positions, may be used and, if the wearable device estimates its own position using the points P1 and P2, information of eight positions may be used to estimate the position of the wearable device. That is, the wearable device has a sufficient number of pieces of information to specify its own position in a 3D space and may thus estimate the position of the thumb on which the wearable device is located from the position information of the joints of the other four fingers. The two methods in which the thumb measures/estimates the position thereof may be similarly applied to a case that the wearable device is worn on the forefinger, the middle finger, the ring finger or the little finger. That is, the wearable device may also measure the position of the tip of a finger on which the wearable device is worn.

If the wearable device is worn on one of the other four fingers instead of the thumb and senses the position of the thumb, the thumb has a different structure from the four fingers and thus, a different process of measuring the position and angle of the thumb is required.

Differently from the other four fingers, the thumb includes a joint connecting the palm and the first phalange and a joint connecting the first phalange and the second phalange, i.e., two joints. That is, even if the wearable device acquires the positions of the two joints, the wearable device may measure the position of die tip of the thumb. Therefore, if the wearable device is worn on any other finger instead of the thumb, the point P3 measured from the points P1 and P2 and the angles θ1 and θ2 becomes the position of the tip of the thumb. Thereby, the wearable device may measure the position of the tip of the thumb with higher precision than the other four fingers.

FIG. 7 is a view illustrating an operating process of the wearable device in accordance with one embodiment of the present invention. FIG. 7 illustrates an embodiment in which the wearable device senses user's mouse input motion and mouse click motion and generates a cursor value and a click value.

If the wearable device 100 moves in a space, the gyroscope sensor 150 and the acceleration sensor 160 measure change of the position, change of the acceleration and change of the tilt of the wearable device 100 in the space. Therefore, the wearable device 100 may sense a user's mouse input motion in which a user wearing the wearable device 100 moves his/her hand in the space. Further, the wearable device 100 may sense a user's mouse click motion in which the user's forefinger or middle finger contacts the user's thumb other during the mouse input motion.

First, an embodiment in which the wearable device 100 senses a mouse input motion and generates of a cursor value will be described. When change of the position of the wearable device 100 in the space is measured, the gyroscope sensor 150 and the acceleration sensor 160 sense a user's mouse input motion. The user's mouse input motion is a user's motion to move a mouse cursor from a specific position to another position and matches a designated cursor value. The cursor value may be transmitted to an external device or the server and designate the movement direction and movement value of the mouse cursor.

The reference position of the cursor value may be the central part 750 of a user's palm. That is, the cursor value according to the mouse input motion may be determined based on the central part 750 of the palm. This is caused by the fact that, even if the user moves his/her hand and fingers, the central part 750 of the palm is less influenced by such movement. That is, when the forefinger and the middle finger are bent due to a mouse click motion, which will be described later, other parts of the hand are difficult to serve as a precise reference position due to movement of muscles connected to the fingers. On the other hand, the position of the central part 750 of the palm is relatively regular even if the mouse click motion is sensed during the mouse input motion. Therefore, the wearable device 100 generates a cursor value based on change of the central part 750 of the palm. Otherwise, the wearable device 100 may use a central part of the hack of the hand as a reference position of the cursor value, instead of the central part 750 of the palm.

Thereafter, a mouse click motion will be described. While the mouse input motion is sensed, the finger recognition unit 120 of the wearable device 100 may continuously sense the positions of the tips 710, 720, 730 and 740 of the fingers. Such a process may be performed in accordance with the above-described embodiment with reference to FIGS. 4 to 6.

While the mouse input motion is sensed according to movement of the wearable device 100 in the space, the wearable device 100 senses whether or not the forefinger and the middle finger come into contact with the thumb. Such a process is performed based on whether or not the position of the tip 710 of the forefinger and the position of the tip 720 of the middle finger are adjacent to the wearable device 100 by a designated distance or less. That is, if the wearable device 100 is worn on the thumb, contact of the forefinger and the middle finger with the thumb means that the positions 710 and 720 of the tips of the two fingers are adjacent to the wearable device 100 by a designated distance or less. Therefore, the wearable device 100 may sense the mouse click motion based on the positions of the tips 710 and 720 of the two fingers.

Thereafter, the wearable device 100 generates a click value matching the mouse click motion. The click value may include a left click value matching a mouse click motion in which the forefinger contacts the thumb and a right click value matching a mouse click motion in which the middle finger contacts the thumb. Further, the wearable device 100 may treat the case that the forefinger and the middle finger contact the thumb as a separate click value.

The wearable device 100 may transmit the generated click value to an external device or the server. Since the mouse click motion is sensed while the mouse input motion is sensed, the click value together with the cursor value according to the mouse input motion is transmitted. Thereby, the wearable device 100 may click the external device or the server while moving the mouse cursor. That is, the wearable device 100 may serve as a "spatial mouse" which is an input unit to control the mouse through movement in a space.

FIG. 8 is a view illustrating an operating process of the wearable device in accordance with one embodiment of the present invention. FIG. 8 illustrates an embodiment in which the wearable device is operated as a spatial mouse without the gyroscope sensor and the acceleration sensor, differently from the embodiment of FIG. 7. FIG. 8 illustrates wearable devices which are worn on the thumbs of both user's hands.

In FIG. 8, wearable devices 100a and 100b receive 3D position information from an external sensor 800 and generate cursor values. That is, the external sensor 800 is an independent device which is provided separately from the wearable devices 100a and 100b and senses positions of the wearable devices 100a and 100b in a space. For example, the external sensor 800 may be attached to a laptop computer, a desktop computer, a Personal Digital Assistant (PDA) or a tablet computer and sense the wearable devices 100a and 100b. Otherwise, since the external device 800 is not attached to a separate device but may be fixedly located, the external device 800 may be a sensor disposed at a fixed position on a desk and the like.

When the external sensor 800 senses the positions of the wearable devices 100a and 100b and transmits the sensed positions of the wearable devices 100a and 100b, the wearable devices 100a and 100b may recognize their own 3D positions in a space without a gyroscope sensor or an acceleration sensor. Such a 3D position may be the position of the central part 810 of the palm, as described above with reference to FIG. 7, or be its own position of each of the wearable devices 100a and 100b.

Space recognition may be used as another method to sense the 3D positions of the wearable devices 100a and 100b. That is, as described above with reference to FIG. 1, depth sensors of the wearable devices 100a and 100b may sense spaces surrounding the wearable devices 100a and 100b by sensing walls within a designated distance. The wearable devices 100a and 100b may indirectly detect their own positions within the spaces while continuously sensing the spaces in such a manner. That is, the wearable devices 100a and 100b may sense their own 3D positions through distances from walls or ceilings.

Hereinafter, a process in which a user wearing the wearable devices 100a and 100b executes a key input motion and then switches to a mouse input motion will be described.

That is, only if the wearable devices 100a and 100b separately sense execution of the mouse input motion by the user during execution of the key input motion of the user, the wearable devices 100a and 100b may generate cursor values instead of generation of input values. Such an embodiment may be applied to FIG. 7 as well as to FIG. 8.

Four embodiments may be considered. First, if the two wearable devices 100a and 100b are spaced from each other by a designated distance or more, the wearable devices 100a and 100b may detect execution of the mouse input motion. That is, when the wearable devices 100a and 100b are spaced from each other during interworking between the wearable devices 100a and 100b, the wearable devices 100a and 100b may switch sensing of the key input motion to the mouse input motion. Second, when the wearable devices 100a and 100b sense the positions of the tips of the fingers and judge that the fingers are bent by designated degrees or more, the wearable devices 100a and 100b may sense the mouse input motion. That is, when the wearable devices 100a and 100b sense bending of the fingers by degrees exceeding a general angle range for typing, the wearable devices 100a and 100b may judge that the user clenches the hand and sense the mouse input motion.

Third, if the angles of the palms are changed by a designated degree or more during sensing of the key input motion, the wearable devices 100a and 100b may sense the mouse input motion. That is, if the hands are rotated by more than a general angle for typing, the wearable devices 100a and 100b may judge a preparatory motion for the user to move the hand in a space. Therefore, the wearable devices 100a and 100b may sense the mouse input motion.

Fourth, there is a case that the height axis coordinates of the wearable devices 100a and 100b are changed to more than a threshold. If the user gets off his/her hands during the key input motion, the height axis coordinates of the wearable devices 100a and 100b are rapidly changed. Thereby, the wearable devices 100a and 100b may recognize that the user executes the mouse input motion. In this embodiment, change of the height axis coordinates may be measured by the gyroscope sensor and the acceleration sensor or measured by the depth sensor. That is, the depth sensor may be continuously operated, measure distances between the plane on which the user executes the key input motion and the wearable devices 100a and 100b, and sense coordinate change using the corresponding distances as the height axis coordinates of the wearable devices 100a and 100b. That is, the depth sensor may be operated as a sensor to sense the bottom surface. Further, both the depth sensor and the finger recognition unit may be operated as sensors to sense the bottom surface. An embodiment in which both sensors are used to measure spatial coordinates will be described later with reference to FIG. 9.

The wearable devices 100a and 100b may sense start of the mouse input motion through various methods in addition to the above-described embodiments. As a more simple method, a simple case that the coordinates of the wearable devices 100a and 100b are rapidly changed may be recognized as a mouse input motion.

Although not shown in FIG. 8, the wearable device in accordance with one embodiment may be operated by interworking with another input device (for example, a stylus pen or a Computer Graphics (CG) pen). Further, since the wearable device may recognize an article as an object, as shown in FIG. 9, the wearable device may recognize a general writing article or a pen-type article not an input device having a specific purpose and be operated to exert the same effect. That is, if a user wearing the wearable device grips another input device, the wearable device may start sensing the motion of the input device as a distance between the wearable device and the input device is close to a critical value or more. Thereafter, the wearable device may generate an input value of the user's motion in consideration of the position of the wearable device, the position of the writing article gripped by the user and the positions of the tips of the user's fingers. That is, the wearable device may be a writing input value matching a user's writing motion using at least one of the above-described various pieces of position information.

If the wearable device interworks with another input device, the external sensor 800 may recognize the position of the input device as well as the 3D position of the wearable device. That is, the external sensor 800 may sense a user's writing motion of moving the corresponding input device by measuring the position of the tip of a stylus pen or a CG pen. The external sensor 800 may sense change of the corresponding position and execute feedback of the sensed change to the wearable device, and the wearable device may generate a writing input value matching the writing motion according to change of the position of the input device. Also, in this case, the wearable device may generate the writing input value in consideration of the position of the wearable device, the position of the input device and the positions of the tips of the user's fingers.

FIG. 9 is a view illustrating an implementation type of a wearable device in accordance with another embodiment of the present invention. Although the above description states that the ring type wearable device surrounds the first phalange of the thumb of a user's hand, the wearable device is not limited thereto. FIG. 9 illustrates a glove type wearable device 100 worn on a palm of a user's hand.

As a user wears the wearable device 100 on the palm of his/her hand and operates the wearable device 100, the wearable device 100 may sense the above-described key input motion, mouse input motion and mouse click motion. In this case, a depth sensor 110 and a finger recognition unit 120 are located at the center of the palm so as to observe all lingers of the user's hand. In addition to the depth sensor 110 and the finger recognition unit 120, other elements shown in FIG. 1 may be disposed at a position adjacent to the palm of the hand. Although the implementation type of the wearable device 100 is changed, the same or similar operation as or to those of the above-described embodiments may be applied to the wearable device 100.

As described above with reference to FIG. 1, FIGS. 2 to 8 illustrate a part of a user's body, i.e., a hand, as an object. However, the object is not limited to the user's hand but may be various articles, such as a wall, a desk and the like, as described above. Hereinafter, a case that the object is an article will be described.

Articles recognized by the wearable device 100 as the object may be divided into a 3-dimensional article and a planar article. First, the 3-dimensional article means an article having 3-dimensional features, for example, a portable terminal. On the other hand, the planar article means an article having a flat surface of a designated size or more and no 3-dimensional effect on the surface, for example, a wall or a desk.

The wearable device 100 may recognize a 3-dimensional article using the above-described depth sensor. During such a process, the wearable device 100 may scan the 3-dimensional article using only the depth sensor without the finger recognition unit and generate a 3D model of the 3-dimensional article according to 3D scan information. Further, when the wearable device 100 measures a relative distance or position with the 3D model of the 3-dimensional article generated using only the depth sensor, the 3D model may serve as a reference point of an absolute coordinate system of the wearable device 100. That is, the wearable device 100 may detect its own 3D position in a 3D spatial coordinate system according to the scanned result of the 3-dimensional article.

Further, the wearable device 100 may recognize a planar article using the depth sensor and the finger recognition unit. The finger recognition unit is named based the above process of exemplarily describing a part of a user's body, i.e., a hand, as the object, and is thus defined by the function thereof not by the name thereof. That is, the wearable device 100 may add a pattern acquired by the finger recognition unit to a 3D model of the planar article sensed by the depth sensor. That is, in order to measure a spatial coordinate system of the planar article, the wearable device 100 needs to recognize specific pattern, print and the like on a plane. Therefore, the wearable device. 100 may recognize the 3D model of the planar article and the 3D position of the planar article in the 3D coordinate system using both the depth sensor and the finger recognition unit.

In accordance with the above-described embodiments, if the wearable device 100 recognizes its own 3D position by recognizing a 3-dimensional/planar article, such a 3D position may become a cursor value in a user's mouse input motion. That is, if the wearable device 100 is connected to an external device, the wearable device 100 may sense a 3-dimensional/planar article around the wearable device 100, generate its own 3D position information, generate a cursor value matching the corresponding position information and transmit the cursor value to an external device. Thereby, a mouse cursor on a screen displayed by the external device moves according to movement of the wearable device 100.

Further, although not shown in FIG. 1, the wearable device 100 may further include an image output unit (not shown) to project an image onto a recognized planar article. If the wearable device 100 generates a 3D model of the planar article, the wearable device 100 may analyze the 3D model and thus select a specific range to project an image onto the planar article. Thereby, the wearable device 100 may output the image of a keyboard or output an arbitrary image, a moving picture or a 3D image (stereoscopic image) to the planar article, such as a desk. The wearable device 100 may measure and analyze its own movement in a 3D space and thus change the angle and position of an image output according to movement of the wearable device 100. Thereby, although the wearable device 100 moves according to a user's motion, the wearable device 100 may output an image of relatively designated position and angle to the planar article and the user may confirm the output image of the fixed position and size in spite of movement of the user's hand.

If both the image output unit and the above-described cursor value are considered, the wearable device 100 may execute more various motions. That is, the wearable device 100 may recognize a 3-dimensional/planar article, generate 3D information, generate a cursor value from the 3D information, and display a mouse cursor corresponding to the cursor value in a displayed image using the image output unit. That is, while the image output unit outputs and displays an image, a 2D image, or a 3D image to a fixed position of the planar article, the wearable device 100 may measure its own 3D information and display a mouse cursor corresponding to the 3D information in the output image. The mouse cursor may be displayed 2-dimensionally or 3-dimensionally based on whether or not the output image is a 2D image or a 3D image.

It will be apparent to those skilled in the art that various modifications and variations can be made in the present invention without departing from the spirit or scope of the invention. Thus, it is intended that the present invention cover the modifications and variations of this invention provided they conic within the scope of the appended claims and their equivalents.

The invention claimed is:

1. A wearable device comprising:
a depth sensor configured to 3-dimensionally sense a user's hand and to generate 3D scan information;
a finger recognition unit configured to sense skin lines of a user's fingers and to generate pattern information; and
one or more processors including an image processor, the one or more processors configured to:
generate a 3D model of the user's hand based on the 3D scan information and add a pattern representing the skin lines of the user's fingers to the 3D model based on the pattern information, wherein the finger recognition unit is configured to sense a key input motion of the user by comparing the sensed skin lines of the user's fingers with the pattern added to the 3D model; and
when the finger recognition unit senses the user's key input motion, generate an input value matching the key input motion.

2. The wearable device according to claim 1, wherein the one or more processors are configured to determine the 3D positions of a first joint connecting the palm of the user's hand and a first phalange of a finger and a second joint connecting the first phalange and a second phalange of the finger, and generate the input value based on the 3D positions of the first joint and the second joint.

3. The wearable device according to claim 2, wherein the one or more processors are configured to determine the 3D positions of the first joint and the second joint and bending angles of the first joint and the second joint, and calculate a position of a tip of the finger, the key input motion of which is sensed, according to the 3D positions and the angles of the two joints.

4. The wearable device according to claim 1, wherein the depth sensor includes at least one of an infrared camera, a Time of Flight (ToF) camera, a laser transceiver and a stereo camera.

5. The wearable device according to claim 1, wherein the finger recognition unit includes at least one of an RGB camera, an infrared camera and a Time of Flight (ToF) camera.

6. The wearable device according to claim 1, further comprising a gyroscope sensor and an acceleration sensor configured to measure movement and tilt of the wearable device in a 3D space.

7. The wearable device according to claim 6, wherein, when the gyroscope sensor and the acceleration sensor sense a user's mouse input motion, the one or more processors are configured to generate a cursor value matching the mouse input motion and determines the position of the central part of the palm or back of the user's hand as the cursor value.

8. The wearable device according to claim 7, wherein:
the finger recognition unit senses a mouse click motion according to positions of a forefinger and a middle finger of the user's hand during sensing of the mouse input motion; and the one or more processors are configured to generate a click value matching the mouse click motion.

9. The wearable device according to claim 1, further comprising a communication unit configured to receive 3D position information from an external device,
wherein the one or more processors are configured to sense a user's mouse input motion based on the 3D position information and generates a cursor value matching the mouse input motion.

10. The wearable device according to claim 1, being of a ring type surrounding a first phalange of a thumb of the user's hand or a glove type worn on a palm of the user's hand.

* * * * *

UNITED STATES PATENT AND TRADEMARK OFFICE
CERTIFICATE OF CORRECTION

PATENT NO. : 10,585,497 B2  
APPLICATION NO. : 15/504644  
DATED : March 10, 2020  
INVENTOR(S) : Jun Ho Park Page 1 of 1

It is certified that error appears in the above-identified patent and that said Letters Patent is hereby corrected as shown below:

In the Specification

In Column 4, Line 49, delete "device." and insert -- device --, therefor.

In Column 6, Line 45, delete "linger" and insert -- finger --, therefor.

In Column 8, Line 28, delete "(WED)," and insert -- (WFD), --, therefor.

In Column 8, Line 30, delete "(NEC)" and insert -- (NFC) --, therefor.

In Column 8, Line 37, delete "au" and insert -- an --, therefor.

In Column 9, Line 49, delete "ore" and insert -- or --, therefor.

In Column 13, Line 1, delete "may," and insert -- may --, therefor.

In Column 13, Line 38, delete "P" and insert -- P1, --, therefor.

In Column 14, Line 42, delete "tour" and insert -- four --, therefor.

In Column 15, Line 2, delete "die" and insert -- the --, therefor.

In Column 15, Line 52, delete "hack" and insert -- back --, therefor.

In Column 15, Line 53, delete "part." and insert -- part --, therefor.

In Column 18, Line 40, delete "lingers" and insert -- fingers --, therefor.

In Column 20, Line 9, delete "conic" and insert -- come --, therefor.

Signed and Sealed this  
Twenty-sixth Day of May, 2020

Andrei Iancu  
*Director of the United States Patent and Trademark Office*